2,842,492

PROCESS FOR INCREASING THE YIELD OF OIL UPON THE FLOODING WITH WATER OF OIL DEPOSITS

Wolf von Engelhardt, Hannover, Ernst Trommsdorff, Darmstadt, and Walter Tunn, Hannover, Germany, assignors, by direct and mesne assignments, of one-half to Rohm & Haas G. m. b. H., Darmstadt, and one-half to Gewerkschaft Elwerath, Hannover, Germany No Drawing. Application March 2, 1955
Serial No. 491,780

Claims priority, application Germany March 3, 1954

3 Claims. (Cl. 252—8.55)

The present invention relates to a process for increasing the yield of oil upon the flooding of oil deposits with water.

Processes are known for increasing the yield of oil by flooding the oil deposits with water containing a viscosity improver. In such processes there are employed water-soluble synthetic resins such as, for example, the alkali salts of polyacrylic acid to increase the viscosity of the flooding water.

It is the object of the present invention to improve upon this process by employing viscosity improvers which increase the degree of oil removal and which enable the flooding to be carried out easily.

The process of the invention comprises flooding oil deposits with water containing a viscosity improver selected from the group consisting of copolymers of an ethylenically unsaturated carboxylic acid and at least one ethylenically unsaturated non-carboxylic compound copolymerizable with said acid and alkali metal salts thereof, the calcium salt of said viscosity improver being soluble in water. The ethylenically unsaturated carboxylic acid in the copolymer may be, for example, methacrylic acid, maleic acid, fumeric acid, acrylic acid, cinnamic acid, itaconic acid and citraconic acid. Typical examples of ethylenically unsaturated noncarboxylic compounds which may be copolymerized with the ethylenically unsaturated carboxylic acid include, for example, unsaturated alcohol esters, e. g., allyl, methallyl, crotyl, and vinyl esters of saturated aliphatic and aromatic monobasic acids such as acetic and propanoic; and vinyl cyclic compounds, such as styrene. Typical copolymers which may be employed include, for example, the copolymers of methacrylic acid with methylmethacrylate, ethyleneglycolmethacrylate, methylacrylate, styrene, and acrylonitrile.

The molecular weight of the copolymers are of importance in connection with their activity. They are advantageously used copolymers having average molecular weights of more than 600,000 and preferably between one million and three million.

The solubility of the calcium salts of the viscosity improvers is determined by the following test. The sodium salts of the copolymers are prepared by neutralizing the copolymer with a quantity of sodium hydroxide corresponding to the number of carboxyl groups. 0.5% aqueous solutions of the sodium salt are then prepared. To 10 cc. portions of the sodium salt solutions there are added 5 cc. of a 0.5% calcium chloride solution.

There are set forth below typical examples of the copolymers suitable for use in the process of this invention and the method of determining the correct percentage composition of the copolymers so that their calcium salts are soluble in water in accordance with the above-described steps.

*Example 1*

The components are first of all polymerized in different quantity ratios, for instance in the quantity ratios set forth below:

| Product | Percent Methacrylic Acid | Percent Methylmethacrylate |
|---|---|---|
| 1 | 50 | 50 |
| 2 | 60 | 40 |
| 3 | 65 | 35 |
| 4 | 70 | 30 |
| 5 | 80 | 20 |

From the copolymers obtained, the sodium salts are prepared by neutralizing the polymer in each case with a quantity of sodium hydroxide corresponding to the number of carboxyl groups. From the products obtained, there are prepared 0.5% aqueous solutions. To 10 cc. portions of the solutions there are added 5 cc. of an 0.5% calcium chloride solution. In this connection, it is found that the solution of product (1) gives a precipitate, the solution of product (2) shows only a slight cloud, while the solution of product (3) remains clear. Solutions (4) and (5) again show a strong precipitation of calcium salt.

The activity of product (3) upon addition to flooding water compared with all other copolymers of this series which are water-soluble in the form of their alkali salts is the most effective.

*Example 2*

| Product | Percent Methacrylic acid | Percent Ethyleneglycolmethacrylate |
|---|---|---|
| 1 | 80 | 20 |
| 2 | 70 | 30 |
| 3 | 50 | 50 |
| 4 | 30 | 70 |

The calcium salts of the copolymeric products (2) and (3) were water-soluble. The average molecular weights of these copolymers were between 1 million and 2 million.

*Example 3*

| Product | Percent Methacrylic Acid | Percent Methylacrylate |
|---|---|---|
| 1 | 90 | 10 |
| 2 | 80 | 20 |
| 3 | 70 | 30 |
| 4 | 60 | 40 |

Upon testing copolymers of methacrylic acid and methylacrylate in the above quantity ratios the calcium salt of the product consisting of 70% methacrylic acid and 30% methylacrylate proves to be water-soluble, while the similar copolymers containing a larger or smaller amount of methacrylic acid gave a precipitation of calcium salt when carrying out the tests described. The viscosity of the 0.5% solutions of the alkali salts of the copolymers 1 to 4 is 120 to 200 centipoises.

*Example 4*

The following copolymers of methacrylic acid and styrene, the 0.5% sodium salt solutions of which showed viscosities of 30–70 centipoises, are tested in accordance with the above-described test method for their suitability as viscosity improvers to the flooding water.

| Product | Percent Methacrylic Acid | Percent Styrene |
|---|---|---|
| 1 | 80 | 20 |
| 2 | 70 | 30 |
| 3 | 60 | 40 |
| 4 | 50 | 50 |

Copolymer 2 shows the best calcium-salt solubility. The average molecular weight was 1,500,000.

*Example 5*

The calcium-salt solubility of copolymers consisting of 65% methacrylic acid and varying quantities of methylmethacrylate and acrylonitrile were tested. The composition of the products examined is as follows:

| Product | Percent Methacrylic Acid | Percent Methylmethacrylate | Percent Acrylonitrile |
|---|---|---|---|
| 1 | 65 | 35 | |
| 2 | 65 | 30 | 5 |
| 3 | 65 | 25 | 10 |
| 4 | 65 | 20 | 15 |
| 5 | 65 | 15 | 20 |

None of copolymers 1 to 5 is precipitated by calcium chloride from the 0.5% sodium salt solution.

The compounds of Examples 1 through 5 whose calcium salts were soluble in water increase the viscosity of the flooding water, increase the degree of oil removal, and improve the resistance with which the solutions can be forced into oil deposits when the copolymers were used with water in flooding oil deposits.

The excellent effects obtained when using the copolymers, namely, ease of carrying out the flooding and good degree of oil removal, made the conclusion obvious that the less active carboxyl-group-containing polymers are precipitated in the form of calcium salts and that these calcium salts lead to a gradual clogging of the pores. This interpretation is in agreement with the observed fact that the forcing-in of solutions of such less suitable polymers meets with a greater resistance than do the solutions of the compounds selected in accordance with the test. It is noteworthy that the copolymers which are determined by means of the above-described test do not form any disturbing precipitates even with ferro and magnesium compounds which are dissolved in smaller quantity than calcium compounds in the connate water of the deposits.

Various modifications and changes may be made in the process of this invention by those skilled in the art and it will be understood that the invention is to be limited only within the scope of the appended claims.

I claim:

1. A process for increasing the yield of oil upon flooding oil deposits with water comprising flooding oil deposits with water containing a viscosity improver having an average molecular weight of at least 600,000 selected from the group consisting of copolymers of ethylenically unsaturated carboxylic acid and at least one ethylenically unsaturated noncarboxylic compound copolymerizable with said acid and alkali metal salts thereof, the calcium salt of said viscosity improver being soluble in water.

2. A process in accordance with claim 1 wherein said viscosity improver is a copolymer containing from about 65% to about 68% of methacrylic acid and from about 35% to about 32% of methylmethacrylate respectively.

3. A process in accordance with claim 1 wherein said viscosity improver has a molecular weight of from about one million to about three million.

References Cited in the file of this patent

UNITED STATES PATENTS

| | | |
|---|---|---|
| 2,341,500 | Detling | Feb. 8, 1944 |
| 2,718,497 | Oldham et al. | Sept. 20, 1955 |